United States Patent
Nishimoto

(10) Patent No.: US 7,920,191 B2
(45) Date of Patent: Apr. 5, 2011

(54) IMAGE CAPTURING APPARATUS IN WHICH PIXEL CHARGE SIGNALS ARE DIVIDED AND OUTPUT IN A DIFFERENT ORDER THAN AN ARRANGEMENT OF PIXELS ON AN IMAGE CAPTURING ELEMENT AND THEN REARRANGED AND STORED IN A SAME ORDER AS THE ARRANGEMENT OF THE PIXELS ON THE IMAGE CAPTURING ELEMENT, AND METHOD THEREOF

(75) Inventor: Masateru Nishimoto, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 578 days.

(21) Appl. No.: 11/999,702

(22) Filed: Dec. 4, 2007

(65) Prior Publication Data

US 2008/0136951 A1 Jun. 12, 2008

(30) Foreign Application Priority Data

Dec. 8, 2006 (JP) ................................. 2006-331342
Apr. 13, 2007 (JP) ................................. 2007-105378

(51) Int. Cl.
*H04N 3/14* (2006.01)
*H04N 5/235* (2006.01)

(52) U.S. Cl. .................................... 348/294; 348/230.1

(58) Field of Classification Search ............... 348/230.1, 348/294
See application file for complete search history.

(56) References Cited

U.S. PATENT DOCUMENTS

2005/0104982 A1 5/2005 Shimazu et al.

FOREIGN PATENT DOCUMENTS

| JP | 9-18792 A | 1/1997 |
| JP | 2005-354656 A | 12/2005 |
| JP | 2006-203437 A | 8/2006 |
| JP | 2006203437 | * 8/2006 |

OTHER PUBLICATIONS

Korean Office Action (and English translation thereof) dated Oct. 28, 2008, issued in a counterpart Korean Application.
Chinese Office Action dated Jun. 5, 2009 (5 pages), and English translation thereof (7 pages), issued in counterpart Chinese Application Serial No. 200710196947.4.

* cited by examiner

*Primary Examiner* — Jason Chan
*Assistant Examiner* — Joel Fosselman
(74) *Attorney, Agent, or Firm* — Holtz, Holtz, Goodman & Chick, PC

(57) ABSTRACT

When driven in an all-pixel read mode, a CCD (1) outputs, with each horizontal sync timing signal, captured image signals including signal charges arranged in a different order from that in which the pixels are actually arranged on a photosensitive surface of the CCD. During this time, the respective pixel signals are digitized sequentially by an A/D converter (5) to corresponding image data, which are then temporarily stored in units of a line in a line buffer (7) via a data distributor (6). In this case, an address generator (8) generates, for the respective image data, write addresses to store the respective image data in the line buffer (7) in the same order as the pixels of the photosensitive surface are actually arranged. In accordance with these write addresses, the data distributor (6) distributes the respective image data to appropriate addresses in the line buffer (7), thereby storing the image data there (FIG. 1).

6 Claims, 8 Drawing Sheets

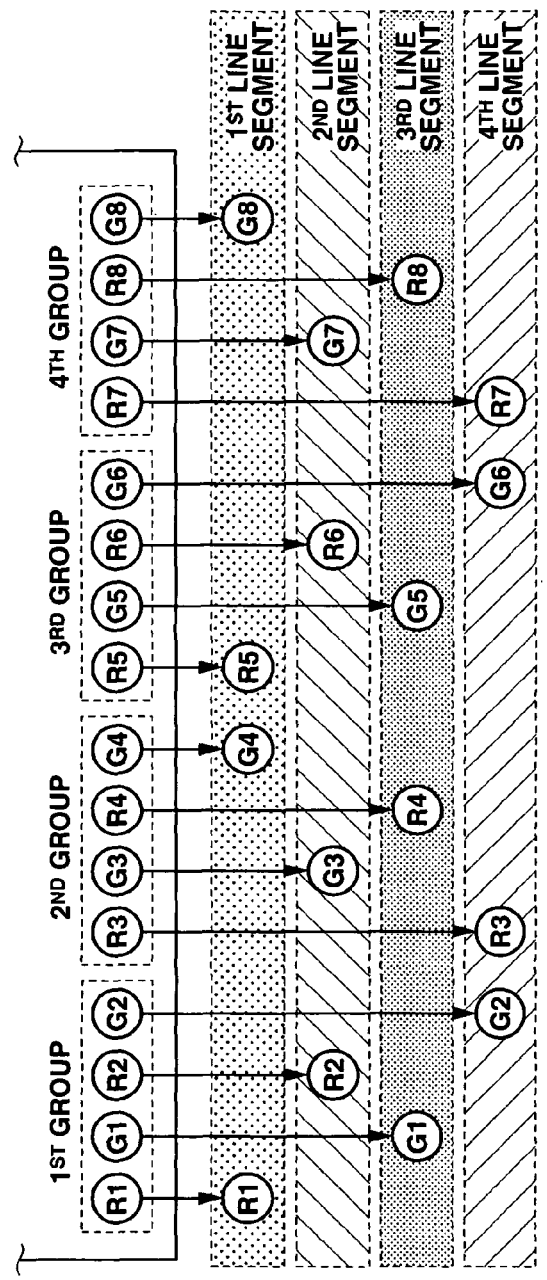
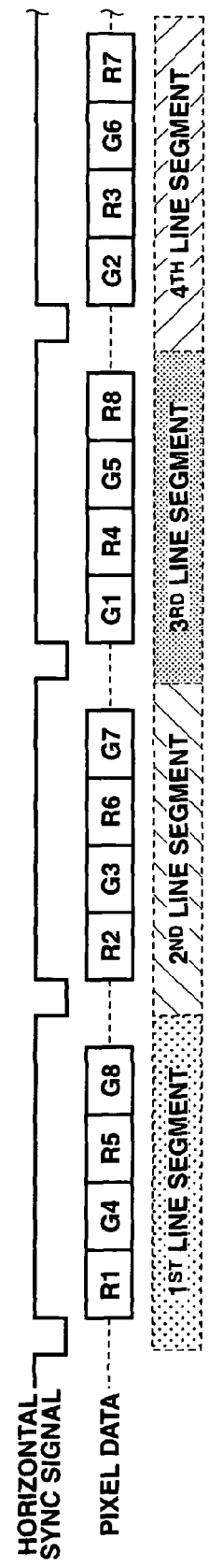

IMAGE CAPTURING APPARATUS IN WHICH PIXEL CHARGE SIGNALS ARE DIVIDED AND OUTPUT IN A DIFFERENT ORDER THAN AN ARRANGEMENT OF PIXELS ON AN IMAGE CAPTURING ELEMENT AND THEN REARRANGED AND STORED IN A SAME ORDER AS THE ARRANGEMENT OF THE PIXELS ON THE IMAGE CAPTURING ELEMENT, AND METHOD THEREOF

BACKGROUND OF THE INVENTION

1. Field of the Invention

The present invention relates to image capturing apparatus useable in digital cameras which include a solid-state image capturing element which outputs charge signals for one horizontal line in a predetermined order of arrangement different from that of pixels on a corresponding horizontal line on a photosensitive surface of the camera. The present invention also relates to an image capturing method.

2. Background Art

Conventionally, many CCDs are used as an image capturing element in image capturing apparatus such as digital cameras. In such CCD, charge signals on pixels arranged on horizontal parallel lines on a photosensitive surface of the CCD 1 are usually transferred in units of a line simultaneously to a horizontal transfer path and then swept away out of the CCD in accordance with a horizontal sync signal. This operation is repeated such that data on all the pixels are outputted with their arrangement order maintained.

A CCD is known which includes an array of pixels each with a color filter in its light path and operates such that the CCD adds (or mixes) charge signals on each adjacent pair of pixels having the same color filters arranged on a respective vertical line (but one pixel of any adjacent pair used for the signal addition is not used as a pixel of another adjacent pair) and reads resulting signals, in order to reduce a time required to process the image signals outputted from the CCD, for example, when a moving image of a subject is captured (as disclosed in Published Unexamined Japanese Patent Application TOKKAIHEI 9-18792).

Recently, in order to perform a series of processing operations at high speeds on image data added and read in a manner mentioned above, a CCD has been thought out which sweeps away charge signals on the respective pixels arranged on each horizontal line on the photosensitive surface of the CCD and added within the CCD while maintaining the actual order of arrangement of those charge signals on the horizontal line.

When charge signals on all the pixels are read without, being added in this CCD, however, the charge signals on pixels arranged on each horizontal line on the photosensitive surface of the CCD are required to be divided into a plurality of groups which are then swept away sequentially with respective successive horizontal sync timing signals. As a result, a captured image signal for one horizontal line outputted from the CCD includes charge signals arranged in a different order from that in which the pixels are actually arranged on the photosensitive surface and various processing operations to be performed on the read image signal would be complicated.

It is therefore an object of the present invention to provide an image capturing apparatus and method for performing various processing operations on the read image signals efficiently even when a solid-state image capturing element is used which outputs charge signals for one horizontal line arranged in a predetermined order different from that in which the pixels are actually arranged in a corresponding line on the photosensitive surface of the element.

SUMMARY OF THE INVENTION

According to one aspect of the present invention, there is provided an image capturing apparatus comprising:

a solid-state image capturing element that includes a 2-dimensional array of pixels forming a photosensitive surface arranged on parallel horizontal lines on the photosensitive surface each pixel including a photoelectric conversion element and that outputs charge signals on the pixels in a predetermined order different from that in which the pixels of the photosensitive surface thereof are arranged;

a converter that sequentially converts to respective pixel data the charge signals on the pixels outputted in the predetermined order from the solid-state image capturing element;

a storage device that stores the respective pixel data converted by the converter;

an address acquirer that acquires write addresses for the respective pixel data such that these pixel data are rearranged and stored in the storage device in the same order as the pixels of the photosensitive surface of the solid state image capturing element are arranged; and a storage controller that stores in the storage device the respective pixel data converted by the converter in accordance with the respective write addresses acquired by the address acquirer.

According to a second aspect of the present invention, there is provided an image capturing apparatus that includes a solid-state image capturing element which in turn includes a 2-dimensional array of pixels forming a photosensitive surface, each pixel including a photoelectric conversion element, the image capturing element outputting charge signals on the pixels in a predetermined order different from that in which the pixels of the photosensitive surface thereof are arranged, the image capturing apparatus comprising:

a converter that sequentially converts to respective pixel data the charge signals on the pixels outputted in the predetermined order from the solid-state image capturing element;

a storage device that stores the respective pixel data converted by the converter;

an address acquirer that acquires read addresses for reading the respective pixel data stored in the storage device in the same order as the corresponding pixels are arranged on the photosensitive surface of the solid state image capturing element; and a reader that reads from the storage devise pixel data stored at the read address acquired by the address acquirer in the storage device.

According to a third aspect of the present invention, there is provided an image capturing method in an image capturing apparatus comprising a solid-state image capturing element that includes a 2-dimensional array of pixels forming a photosensitive surface, each pixel including a photoelectric conversion element, the image capturing element outputting charge signals on the pixels in a predetermined order different from that in which the corresponding pixels are arranged on the photosensitive surface, the method comprising the steps of:

sequentially converting to respective pixel data the charge signals on the pixels outputted in the predetermined order from the solid-state image capturing element;

acquiring write addresses for storing the respective pixel data in the storage device in the same order as the corresponding pixels of the photosensitive surface of the solid state image capturing element are arranged; and storing in the storage device the respective converted pixel data in accordance with the respective acquired write addresses.

According to a fourth aspect of the present invention, there is provided an image capturing method in an image capturing apparatus comprising a solid-state image capturing element which in turn includes a 2-dimensional array of pixels forming a photosensitive surface, each pixel including a photoelectric conversion element, the image capturing element outputting charge signals on the pixels in a predetermined order different from that in which the corresponding pixels are arranged on the photosensitive surface, the method comprising the steps of:

sequentially converting to respective pixel data the charge signals on the pixels outputted in the predetermined order from the solid-state image capturing element;

storing the respective converted pixel data;

acquiring read addresses for reading the respective pixel data stored in the storage device in the same order as the corresponding pixels are arranged on the photosensitive surface of the solid state image capturing element; and reading from the storage devise pixel data stored at the acquired read address in the storage device.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIGS. 6A and 6B schematically illustrate operation of a CCD in an all-pixel read mode;

FIG. 7 is a flowchart indicative of procedures to be performed by the CPU after the power supply is turned on.

DETAILED DESCRIPTION OF THE EMBODIMENTS

One embodiment of the present invention will be described next with reference to the accompanying drawings. The present embodiment relates to a digital camera which has, as basic modes, a record mode in which an image of a subject is captured and a replay mode in which the recorded image is replayed. The recording mode includes, as sub-modes, a still-image capture mode in which a still image is captured and a moving-image capture mode in which a moving image is captured. The still-image capture mode includes, as sub-modes, a normal image-capture mode and a high-sensitivity image capture mode.

The normal image capture mode as the sub-mode of the still-image capture mode is a high general-purpose image capture mode which will be used in general image capturing operations. The high-sensitivity image capture mode is used to perform a high-sensitivity image capturing operation involving addition of pixels in order to ensure exposure enough to capture an image of a dark subject and prevent an influence of a shake of the camera due to a shake of a user's hands which hold the camera and an influence of a shake of a rapidly moving subject. The user can manually select one of the normal and high-sensitivity image capture modes while the high-sensitive image capture mode can be set automatically depending on the image capturing conditions.

Figure 1:
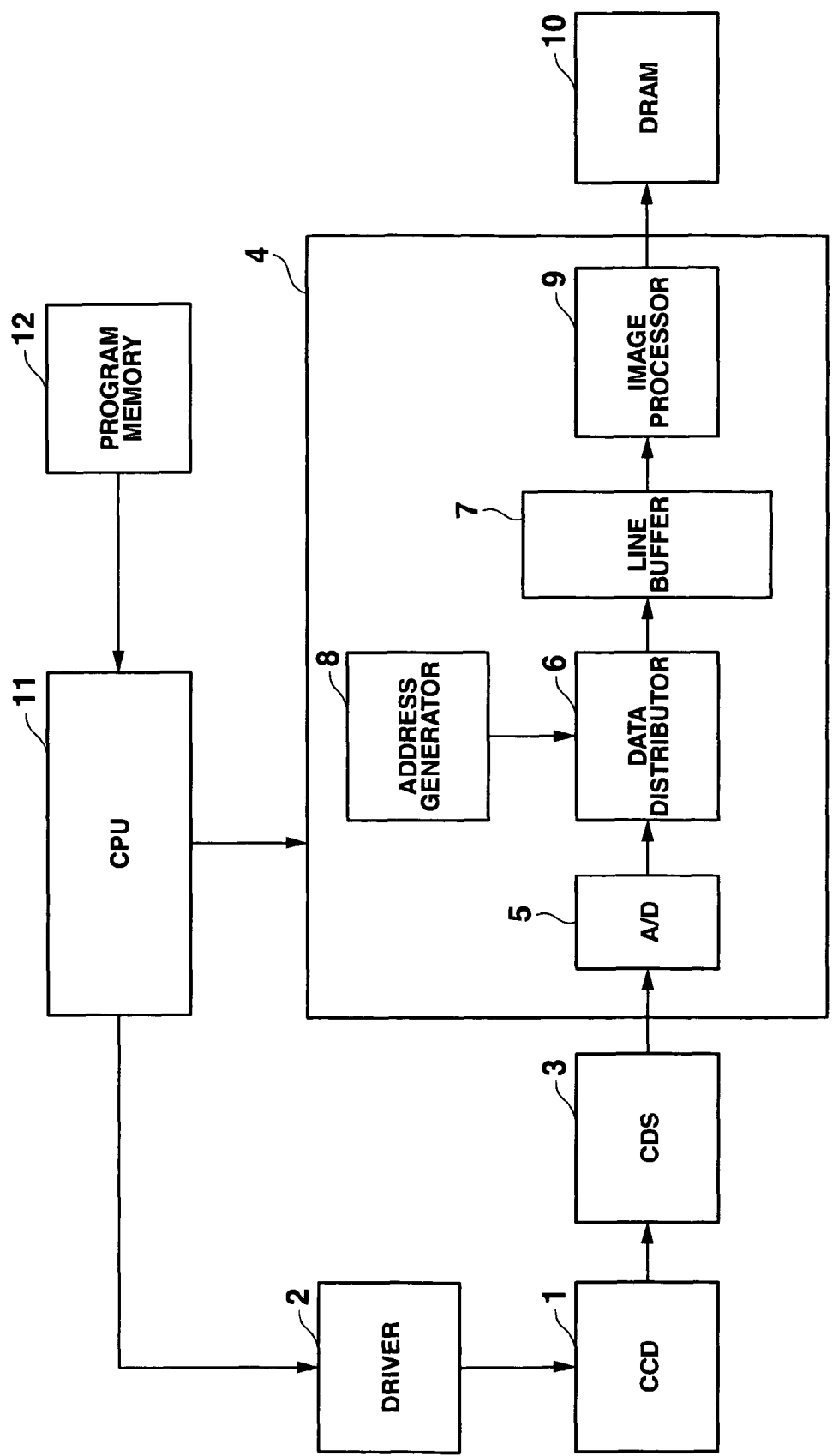
FIG. 1 is a block diagram of an essential portion of a digital camera according to one embodiment of the present invention.

FIG. 1 is a block diagram of an essential portion of the digital camera of this embodiment. The digital camera comprises a CCD 1 made of a solid-state image capturing element having a specified structure mentioned above, and a driver 2 that drives the CCD 1. The CCD 1 has, as a read (or drive) mode, a pixel charge add mode in which among a plurality of (n×m) pixels thereof, charge signals on pixels arranged on each of horizontal and vertical lines on the photosensitive surface of the CCD 1 are internally added in the manner mentioned above in the description of the prior art, which applies in the following descriptions as long as the working "add" is used and the added signal charges are read, and an all-pixel read mode in which the charge signals on all the pixels are read out as they are. The CCD 1 is driven in accordance with a drive signal corresponding to the read mode supplied by the driver 2 under control of the CPU 11 and converts an optical image of the subject focused on the photosensitive surface of the CCD 1 via an optical system (not shown) to an electric signal, which is then outputted as a captured image signal.

The output from the CCD 1 will be subjected to noise elimination by a CDS (Correlated Double Sampling) circuit 3 and then converted to pixel data by an A/D converter 5 of a signal processor 4. The pixel data is then stored temporarily via a data distributor 6 in a line buffer 7, which has a capacity for storage of pixel data for one line on the photosensitive surface of the CCD 1.

During drive of the CCD 1, the data distributor 6 will store image data from the A/D converter 5 at a relevant address in the line buffer 7 in accordance with a write-in address received from an address generator 8.

The pixel data stored in the line buffer 7 will be sequentially delivered to an image processor 9, which each time pixel data for a predetermined number of lines become complete in the image processor 9, the pixel data are subjected to an interpolation process for color information on the respective pixels and/or an image processing operation including YUV conversion. Then, resulting data is sequentially stored in a DRAM 10.

The above-mentioned blocks of the digital camera are controlled by the CPU 11 that controls the whole digital camera. Programs required by the CPU 11 to control the respective blocks, for example, an automatic exposure (AE) control program that adjusts a charge storage (or exposure) time of the CCD 1 depending on the brightness of the subject, and various data required for various control operations are stored in a program memory 12 which may be a rewriteable volatile memory such as an EEPROM or a flash memory. The program memory 12 has also stored programs for causing the CPU 11 to operate as a drive mode setting unit and a drive mode determiner of the present invention.

Although not shown in FIG. 1, the digital camera has push buttons (not shown) which will be used to cause the camera to perform its corresponding functions, a liquid crystal monitor that displays a through image in an image-capturing standby state and functions as an electronic view finder, and an image memory that records captured still images and moving images.

The CCD 1 has the specified structure as mentioned above. When driven in the pixel add mode, the CCD 1 outputs a plurality of charge signals arranged on each horizontal line, produced by addition within the CCD 1, in accordance with a horizontal sync timing signal. In the all-pixel read mode, the charge signals on pixels arranged on each horizontal line are outputted sequentially as a plurality of group of line segment signals rearranged on a like number of line segments in accordance with a like number of successive horizontal sync timing signals which constitute a complete cycle.

Thus, when driven in the pixel add mode, the groups of charge signals produced by addition are outputted from the CCD 1 depending on the order of arrangement of the pixels composing the photosensitive surface of the CCD1. In contrast, in the all-pixel read mode, charge signals on all the pixels not added are outputted as shown in FIGS. 6A and 6B. For convenience of explanation, FIG. 6A assumes that the photosensitive surface of the CCD 1 has n vertical pixels×16 horizontal pixels and shows a relationship between the positions of the respective pixels on each of the horizontal lines and charge signals on the respective pixels outputted in accordance with each horizontal sync timing signal. FIG. 6B illustrates the order that charge signals on the respective pixels on each horizontal line are outputted.

More specifically, as shown in FIG. 6A, the charge signals on all the pixels of the CCD 1 are outputted sequentially as four groups of line segment signals for each line, with four corresponding successive horizontal sync timing signals which constitute a complete cycle. In this case, each group of line segment signals comprises four charge signals each selected one from a respective one of the four groups of pixels into which the pixels arranged on that horizontal line on photosensitive surface of the CCD 1 are divided. That is, as shown in FIG. 6B, in the all-pixel read mode, the CCD 1 outputs image signals including charge signals arranged in a predetermined order different from that in which the pixels on the photosensitive surface of the CCD 1 are arranged. Actually, the CCD 1 has 16 pixels or more on each horizontal line. Thus, the number of groups into which the pixels on each horizontal line are divided is dependent on the number of those pixels: that is, in this case, the number of pixels on each horizontal line/4. Hence, a group of line segment signals is composed of charge signals on the pixels equal in number to the pixel groups.

In the all-pixel read mode, the address generator 8 generates and supplies horizontal line division write addresses to the data distributor 6 to distribute and store respective image data, which compose four line segment signals of a respective one of the four groups for each line outputted sequentially from the CCD 1 and digitized by the A/D converter 5, in the line buffer 7 in a state where the pixels are rearranged as shown in FIG. 5. In this pixel add mode, the address generator 8 also generates and supplies normal write addresses to the data distributor 6 to store added pixel data for each line, arranged in the same order as the pixels of the photosensitive surface of the CCD 1 are actually arranged and digitized by the A/C converter 5, in the line buffer 7 with the order of the outputted image data maintained.

Figure 2:
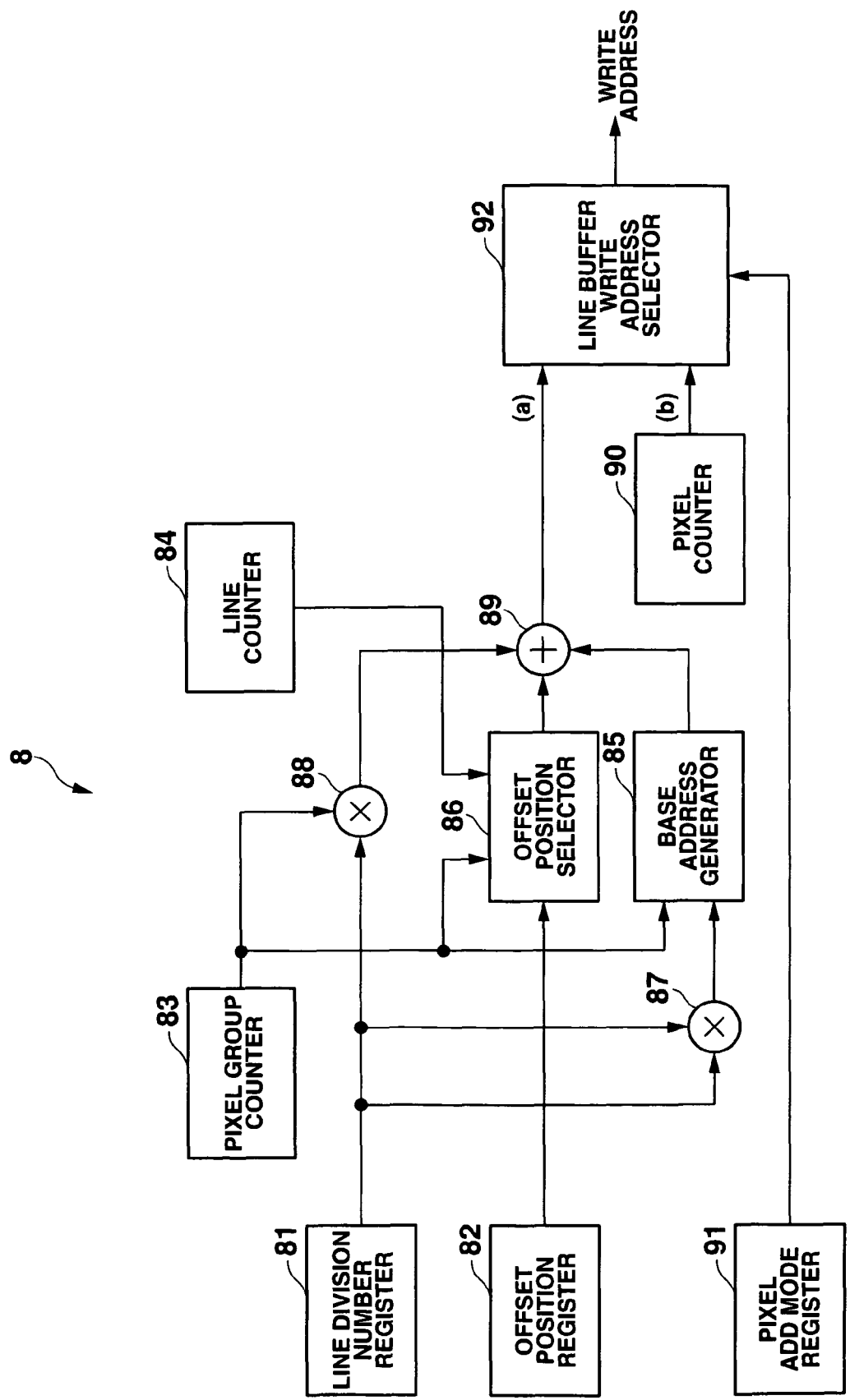
FIG. 2 is a block diagram of the details of an address generator.

FIG. 2 is a block diagram indicative of the details of the address generator 8, which includes a line division-number register 81, an offset position register 82, a pixel group counter 83, a line counter 84, a base address generator 85, an offset position selector 86, a first multiplier 87, a second multiplier 88, an adder 89, a pixel counter 90, a pixel addition mode register 91, and a line buffer write address selector 92.

The line division-number register 81 holds a line division number (in this embodiment, "4") which is a parameter indicative of how many horizontal sync timing signals are required to output pixel data for one line in the CCD 1. The line division number is set by the CPU 11 and also stored in the program memory 12.

The pixel group counter 83 determines which of the pixel groups (for example, shown in FIGS. 6A and 6B) the pixel data digitized by the A/D converter 5 belongs to. The pixel group counter 83 increments each time image data is inputted with a reference clock. When the counts "0"-"3" taken sequentially by the counter 83 corresponds to the number of (here, four) pixels of each pixel group. When the count reaches "3", a next count returns to "0", which is repeated.

The actual number of horizontal pixels of the CCD 1 is more than 16. Thus, even when the pixel data digitized by the A/D converter 5 belongs to any one of 5th, 9th, 13th, . . . , and nth groups not shown in FIG. 6A, the count of the pixel group counter 83 is "0".

The line counter 84 will specify which of the line segments in one cycle (an nth line segment in FIGS. 6A and 6B) the pixel data now being read into the data distributor 6 involves. Each time image data for one line segment is inputted with a reference clock, the line counter 84 increments. Thus, as line segments are sequentially inputted, the line counter 84 sequentially takes counts "0"-"3" and then is reset to "0" like the pixel group counter 83. Such counting operation is repeated.

Figure 3:
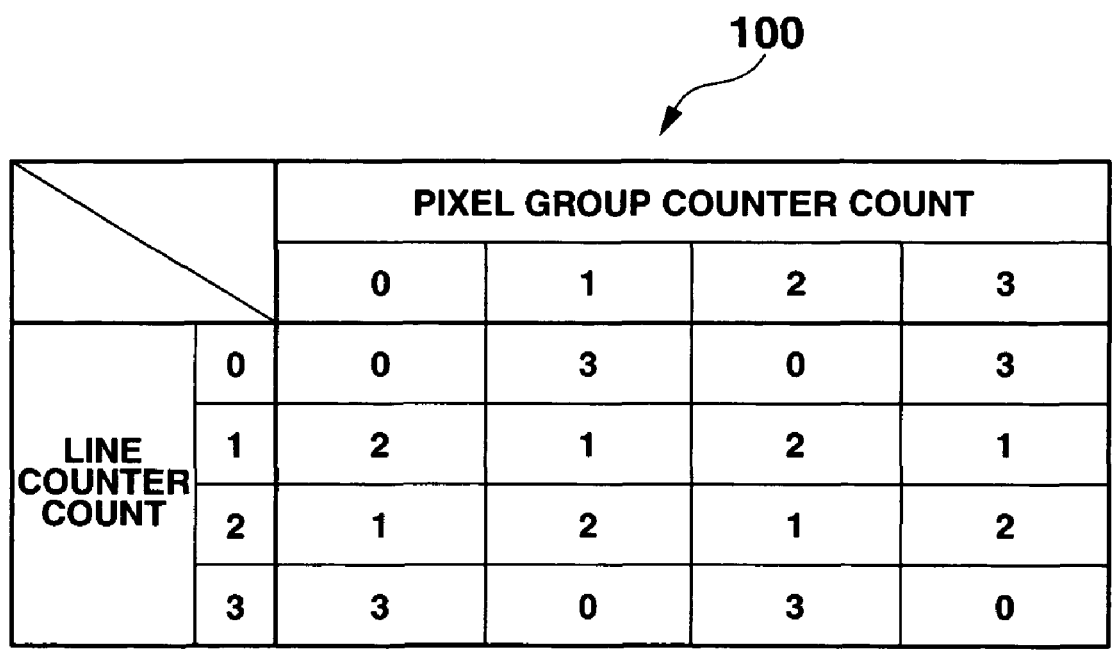
FIG. 3 schematically illustrates offset data held by an offset position register.

The offset position register 82 will hold offset data 100 which indicates where the inputted image data is in the pixel group involved. As shown in FIG. 3, the offset data 100 is table data indicative of an offset position corresponding to a count of the pixel group counter 83 and a count of the line counter 84. The offset data 100 will be set by the CPU 11 and stored in the program memory 12.

The base address generator 85 will generate a base address as a reference for a write address. Each time the count of the pixel group counter 83 is reset to "0", the base address generator 85 increments its base address value by "16" which corresponds to a squared value of the line division number "4" set in the line division number register 81 outputted from the first multiplier 87, or the number of pixels of each pixel group ("4")×the line division number ("4") for each cycle, and then outputs an resulting base address.

The offset position selector 86 selects an offset position corresponding to the counts of the line counter 84 and the pixel group counter from the offset data held in the offset position register 82.

The second multiplier 88 will multiply the line division number ("4") held in the line-division number register 81 by the count value ("0"-"3") of the pixel group counter 83, thereby calculating the head position of a pixel group to which the inputted pixel data belongs (or the left-end pixel position of the pixel group of FIG. 6A).

The adder 89 will add a base address generated by the base address generator 85, a head position of the pixel group calculated by the second multiplier 88, and an offset position selected by the offset position selector 86 to generate a write address for the digitized pixel data or a horizontal line division write address "Aa" to be used when the CCD 1 is driven in the all-pixel read node, and then outputs the address "Aa" to the line buffer write address selector 92.

The pixel counter 90 is a simple one which increments its count each time pixel data is inputted to the signal processor 4 with the reference clock, thereby generating a normal write address "Ab" to be used when the CCD 1 is driven in the pixel add mode. The address b is then outputted to the line buffer write address selector 92 to which a horizontal line division write address "Aa" is outputted from the adder 89. The pixel add mode register 91 will store a value indicative of the currently set drive mode for the CCD 1 and rewritten by the CPU 11 as required.

The line buffer write address selector 92 will select a write address which will be outputted to the data distributor 6 in accordance with a drive mode for the CCD 1 indicated by a value stored in the pixel add mode register 91. The selector 92 will select and output a horizontal line division write address "Aa" which is outputted from the adder 89 in the all-pixel read mode, and a normal write address "Ab" which is outputted from the pixel counter 90 in the pixel add mode.

Figure 4:
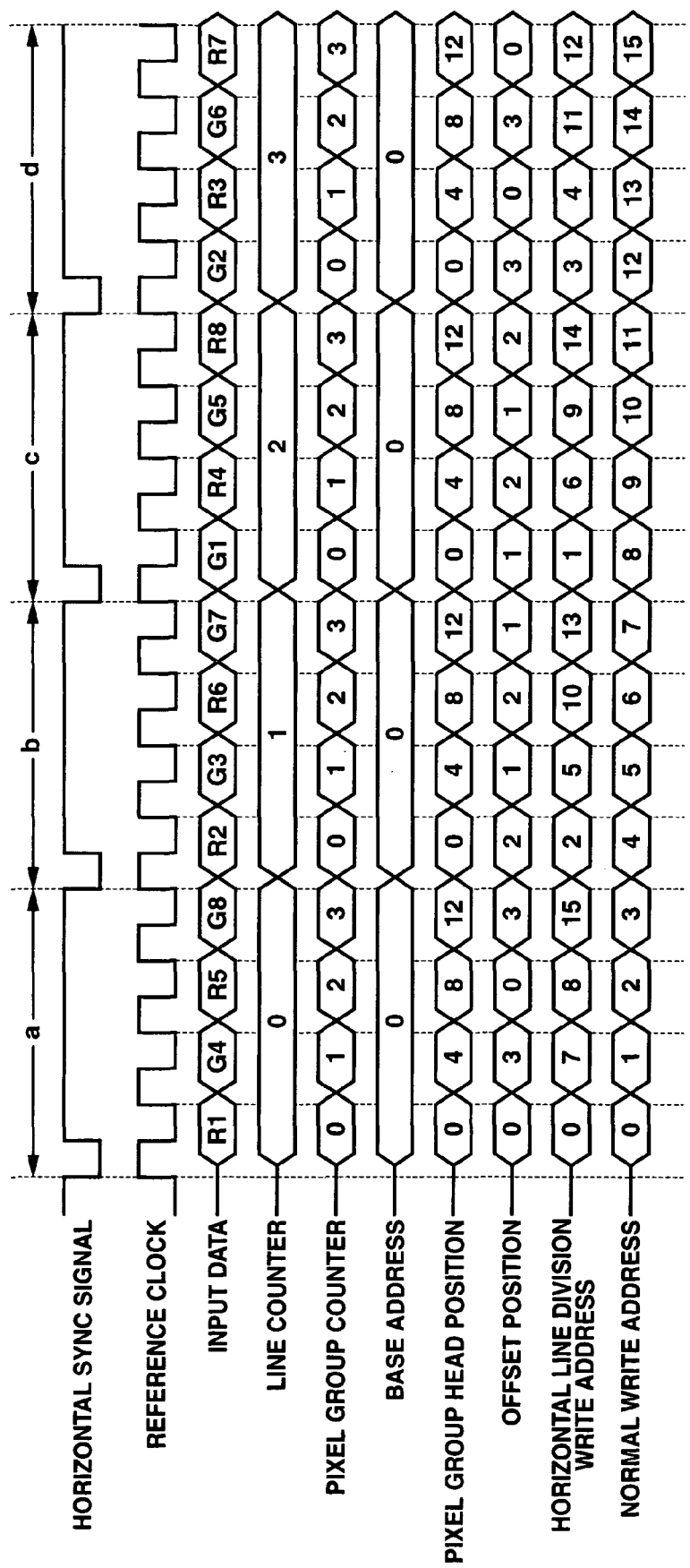
FIG. 4 is a timing chart indicative of operation of the address generator.

FIG. 4 illustrates a timing chart of operations of the respective elements of the address generator 8 when pixel data (here, of 16 pixels) for one line on the CCD 1 of FIG. 6A are read, and horizontal line division write addresses and normal write addresses which will be generated by the address generator 8 at those times.

As shown in FIG. 4, each time a line segment changes or, for example, four pixel data are inputted with a reference timing signal, the line counter 84 increments. Thus, as the line segment changes sequentially, the line counter 84 changes sequentially from "0" to "3" and then back to "0". During reading of pixel data for each line segment, each time pixel data is inputted, the pixel group counter 83 increments. Thus, as the pixel data are inputted sequentially, the pixel group counter 83 changes sequentially from "0" to "3" and then back to "0". The head position of a pixel group calculated by the second multiplier 88 changes in the order of "0", "4", "8" and "12" and then back to "0". A base address outputted by the base address generator 85 is always "0" because the number of pixels to be read in each line segment is 4 (for one group). Actually, the number of pixels to be read in each line segment is more than 4. Thus, in the respective pixel data reading time periods for the corresponding line segments of a series of successive horizontal lines on the photosensitive surface of the CCD, the base addresses change sequentially to "0", "16", "32", . . . when the pixel group counter 83 is reset sequentially to "0".

During a read period "a" in which pixel data R1, G4, R5, and G8 for a first line segment are read at the start of the pixel reading, the offset position selected by the offset position selector 86 changes in order of "0", "3", "0", "3", . . . when the respective pixel data are digitized sequentially. Thus, the horizontal line division write address "Aa" (="base address"+ "pixel group head position"+"offset position") generated by the adder 89 changes sequentially in the order of "0", "7", "8", "15".

During a data read period "b" for pixel data R2, G3, R6 and G7 for a second line segment, the offset position changes sequentially in the order of "2", "1", "2", "1". Thus, the horizontal line division write address "Aa" changes sequentially in the order of "2", "5", "10" and "13". Subsequently, during a data read period "c" for a third segment line, the horizontal line division write address "Aa" changes sequentially in the order of "1", "6", "9" and "14". Thereafter, during a data read period "d" for a fourth segment line, the horizontal line division write address "Aa" changes sequentially in the order of "3", "4", and "12".

In parallel with the above operations, when pixel data are inputted sequentially to the signal processor 4 during the whole read period "a"-"d", the pixel counter 90 repeats its simple incrementing operation and the normal write address "Ab" changes in the order of "1", "2", "3", "4", . . . . As described above, the line buffer write address selector 92 selects the horizontal line division write address "Aa" in the all-pixel read mode, as described above. Thus, the address generator 8 outputs a horizontal line division write address "Aa" as a final write address to the data distributor 6.

Figure 5A:
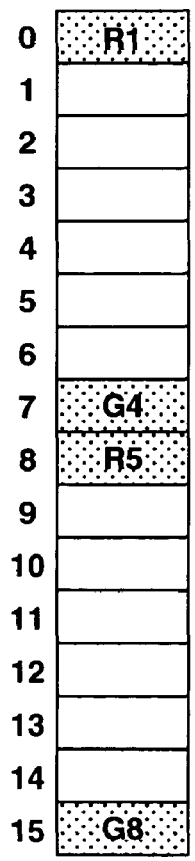
FIGS. 5A-5D schematically illustrate changes in the stored state of pixel data in a line buffer.
Figure 5B:
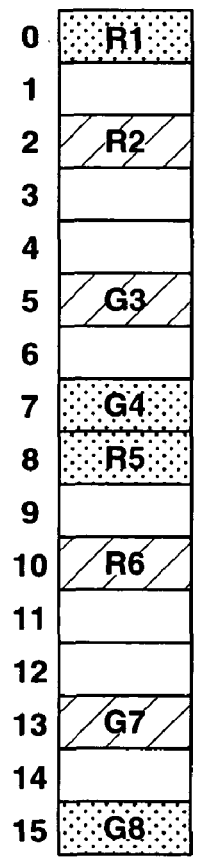
Figure 5C:
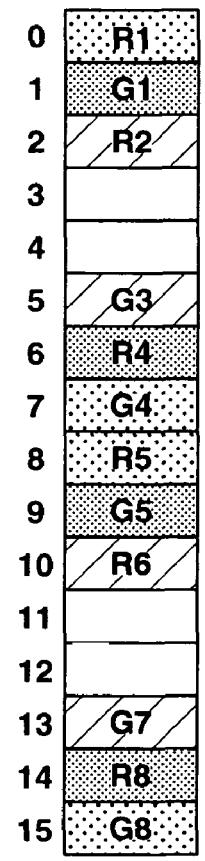
Figure 5D:
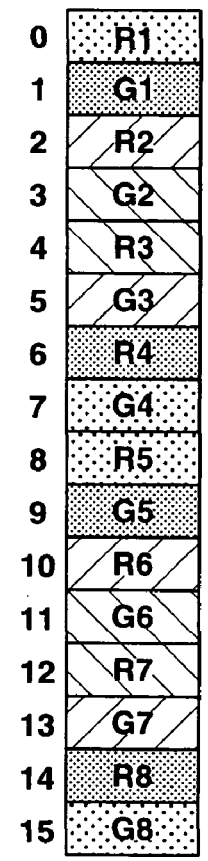

FIGS. 5A and 5B show a transition of a storage state of image data in the line buffer 7 during the above operations. FIG. 5A shows a storage state of the pixel data in the line buffer 7 when the read period "a" for the first line has terminated, and FIGS. 5B-5D storage states when the respective states of read periods "d"-"d" have terminated.

That is, even when the captured image signals outputted from the CCD 1 in the all-pixel read mode are different in arrangement from the actual pixels arranged on the photosensitive surface of the CCD 1, as shown in FIGS. 6A and 6B; the image signals are sequentially converted to the respective pixel data while these pixel data are sequentially stored in units of a line in the line buffer 7 such that these data are rearranged in the same order as the pixels are actually arranged on the photosensitive surface of the CCD 1.

Thus, captured image data for the respective lines composing Bayer data can be inputted from the line buffer 7 to the image processor 9. Thus, even in the all-pixel read mode, image processing such as interpolation or extrapolation and/ or YUV conversion is performed efficiently.

Figure 7:
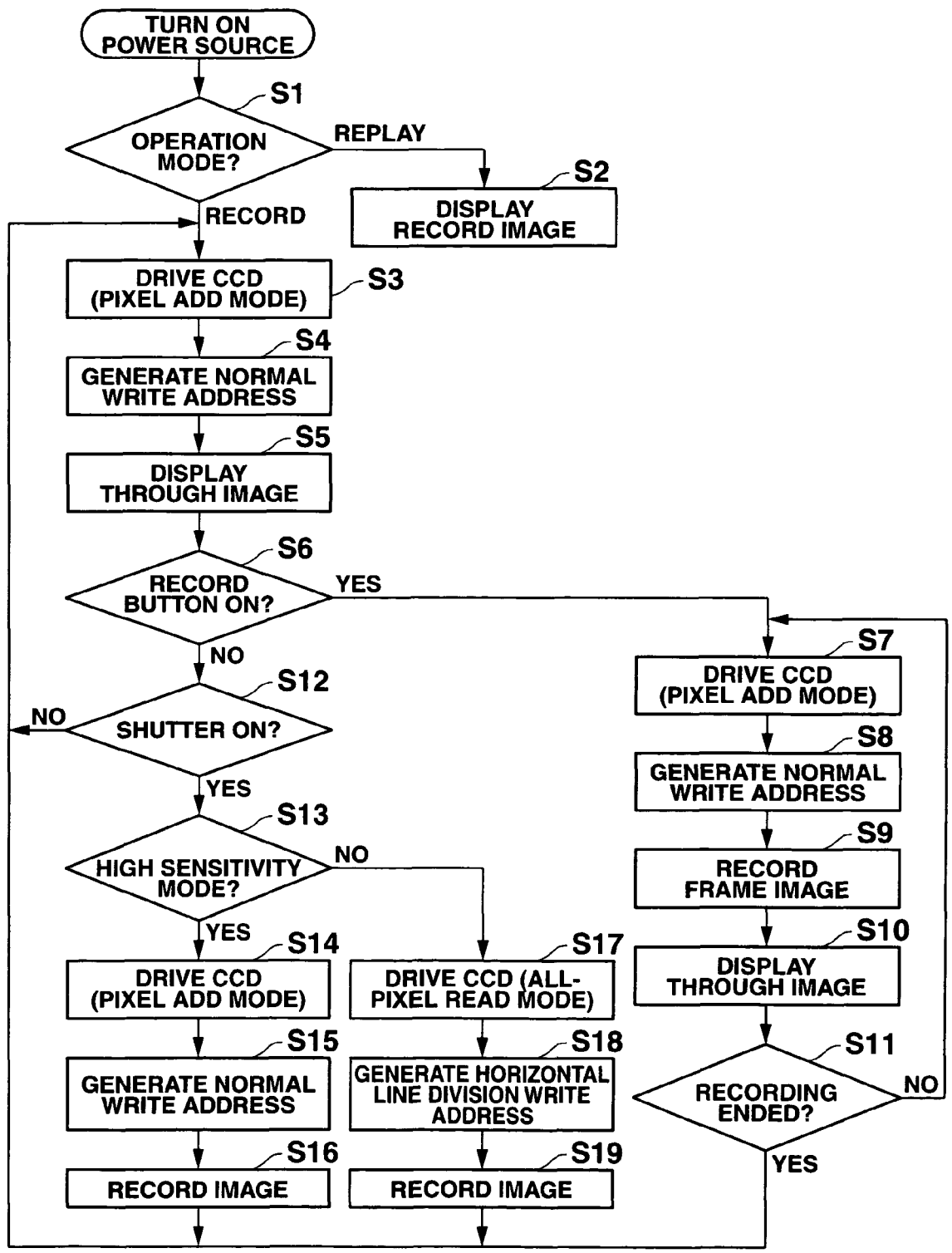

A process to be performed by the CPU 11 after the power source is turned on in the digital camera will be described referring to a flowchart of FIG. 7.

When the power source of the digital camera is turned on, the CPU 11 starts its operation and then confirms the current (basic) operation mode (step S1). The operation mode at this time may be, for example, a predetermined one or another operation mode corresponding to operation of one of record and replay mode setting key switches provided independently to serve also as a power source turning-on switch.

When the operation mode is the replay mode ("REPLAY" in step S1), any recorded image is displayed (step S2). When the operation mode is the record one ("RECORD" in step S1), driving of the CCD 1 in the pixel add mode, generation (and output) of a normal write address in the address generator 8 and display of a through image start (steps S3-S5).

Then, when a record button is depressed during the display of the through image or in the image capture standby state to give a command to start to record a moving image (YES in step S6), driving of the CCD 1 in the pixel add mode at a frame rate when the moving image is recorded (step S7), and generation of a normal write address by the address generator 8 (step S8) start. Thus, data indicative of charge signals on the respective pixels added within the CCD 1 are stored in the line buffer 7 in the same order that the signal charge data was outputted for each line from the CCD 1. Then, the signal charge data are delivered in units of a line from the line buffer 7 to the image processor 9 where after subjecting to predetermined image processing, resulting charge signal data is stored in the DRAM 10. Then, a frame image based on the image data stored in the DRAM 10 is recorded in a predetermined image memory (step S9) and then a through image based on the image data is displayed (step S10).

Then, the processings in steps S7-S10 are repeated until the image recording is terminated, for example, until the recording button is redepressed, until a predetermined all-image recording time elapses, or until vacant spaces in a predetermined image memory capacity are completely lost (NO in step S11). When the recording is terminated (YES in step S11), the processing returns to step S3 to wait another image capture command.

On receiving a still-image capture command due to depression of the shutter key in the image capturing standby state (YES in step S12), first, it is confirmed whether a high sensitivity image capture mode is set as the still-image capture mode at that time (step S13). The high sensitivity image capture mode is set manually by the user's mode selection or otherwise automatically set by the CPU 11 depending on the image capturing conditions.

Although not shown, the automatic setting of the high sensitivity image capture mode is performed based on brightness information on a through image displayed directly therebefore in the normal image capture mode. This automatic setting is performed, for example, when the brightness of a subject is very low and an appropriate exposure cannot be obtained even by automatic exposure control or when the exposure time by the automatic exposure control is long compared to a predetermined time and hence there is a possibility of a shake of the subject or the user's hand which holds the camera.

When the still-image capture mode is the high sensitivity image capture mode (YES in step S13), the CCD 1 is driven in the pixel add mode to obtain a still image for recording (step S14) and the address generator 8 is caused to generate a normal write address (step S15). Thus, data on the charge signals on the respective pixels added within the CCD 1 are stored for each line in the same order as the data were outputted from the CCD 1. Then, the charge signal data are delivered for each line from the line buffer 7 to the image processor 9 where the data are subjected to predetermined image processing. Resulting image data are then stored in the DRAM 10 and a still image based on the image data stored in the DRAM 10 is then recorded in a predetermined image memory (not shown) (step S16). The processing then returns to step S3 to wait another image capture command.

When the still-image capture mode is not the high sensitivity image capture mode but the normal image capture mode (NO in step S13), the CCD 1 is driven in the all-image capture mode to obtain a still image for recording (step S17), and then the address generator 8 is caused to generate a horizontal line division write address (step S18). Thus, the charge signal data on all the pixels of the CCD 1 are stored for each line in the line buffer 7 in the same order as the actual pixels on the photosensitive surface of the CCD 1 are arranged. Then, the charge signal data are delivered in units of a line from the line buffer 7 to the image processor 9 where the data are subjected to the predetermined processing and then resulting image data are stored in the DRAM 10. A still image based on all the image data accumulated in the DRAM 10 is then recorded in the predetermined image memory (step S19). Then, the processing returns to step S3 to wait another image capture command.

In the above embodiment, it has been described that when the CCD 1 is driven in the all-pixel read mode, the signal charges on the pixels in one line on the photosensitive surface of the CCD 1 are sequentially outputted a quarter at a time, i.e. with four respective successive horizontal sync timing signals constituting a complete cycle and that, in this case, four pixels are handled as one group. Meanwhile, when a different CCD is used in which the line segments used are the same in number as the pixels of each pixel group, but the number is not 4, the address generator 8 is required to change its composition as follows:

The number of line segments and the value of the offset data 100 as parameters to be set in the line division number register 81 and the offset position register 82, respectively, are changed to corresponding appropriate values. Further, the maximum counts of the pixel group counter 83 and the line counter 84 are required to be changed to corresponding appropriate values. Thus, in order to cope with the use of the different CCD only minor modifications such as changing the set values are required without changing the basic arrangements of those components.

The specified structure of the address generator 8 is not limited to that shown in FIG. 2. As described above, any address generator may be used if it has such a function that while the captured image signals outputted from the CCD 1 are sequentially converted to corresponding pixel data, the pixel data are sequentially stored in units of one line in the line buffer 2 in a state in which the pixel data for each line are rearranged in the same order as the corresponding pixels on the photosensitive surface of the CCD 1 are actually arranged.

In the previous embodiment, it has been illustrated that while the captured image signals outputted from the CCD 1 in the all-image read mode are sequentially converted to respective pixel data, the converted pixel data for one line are rearranged and stored in the line buffer 7 in the same order as the actual pixels are arranged on the photosensitive surface of the CCD 1. In contrast, in a second embodiment of the present invention, the arrangement may be such that respective pixel data for one line are temporarily stored in the line buffer 7 in the order of their conversion and when all the pixel data for that line become complete, these data are read in the same order as the actual pixels are arranged on the photosensitive surface of the CCD 1 or read simultaneously while being rearranged and then inputted into the image processor 9. In this embodiment, even when the captured image signals outputted from the CCD 1 in the all-pixel read mode are made of pixel data which are arranged in a different order from that in which the actual pixels are arranged on the photosensitive surface of the CCD 1, they are efficiently subjected to image processing such as interpolation/extrapolation and YUV conversion.

Figure 8:
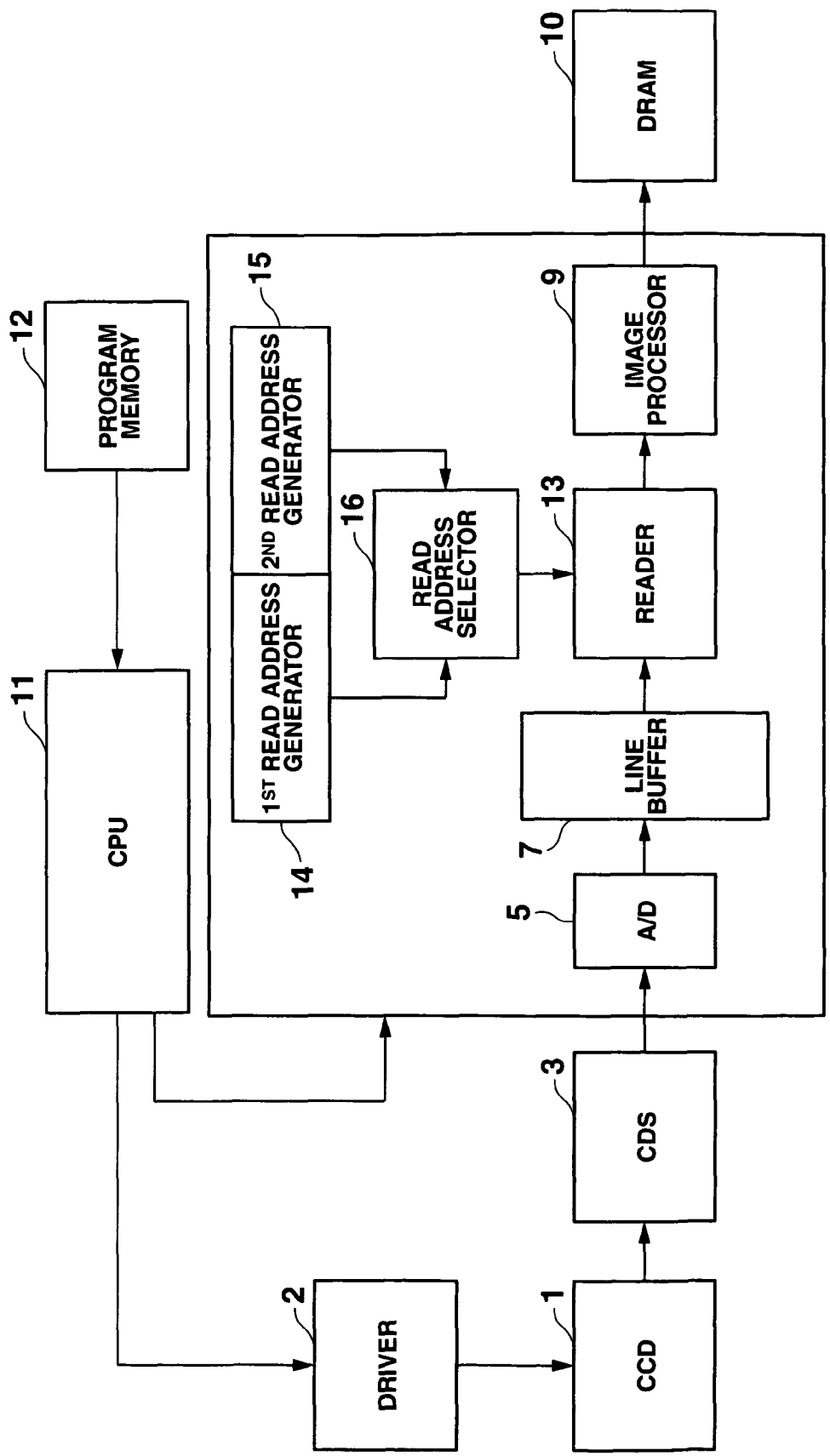
FIG. 8 shows another embodiment of the present invention.

As shown in FIG. 8, in the specified configuration of this embodiment, for example, there is no data distributor such as shown by 6 in FIG. 1. A reader 13 is provided between the line buffer 7 and the image processor 9 such that when pixel data for one line is stored in the line buffer 7, the reader 13 selectively reads respective pixel data stored at predetermined addresses in and from the line buffer 7. Further, instead of the address generator 8 of FIG. 1, an alternative address generator is provided which includes a first read address generator 14 which sequentially generates horizontal line division read addresses to read pixel data for one line, stored in the line buffer 7, in the same order as the actual pixels for the corresponding line are arranged on the photosensitive surface of the CCD 1, a second read address generator 15 that sequentially generates normal read addresses to read the pixel data for one line stored temporarily in the line buffer 7 as they are and a read address selector 16 that selectively delivers to the reader 13 horizontal line division read addresses generated by the first read address generator 14 when the CCD 1 is in the all-pixel read mode, and normal read addresses generated by the second read address generator 15 when the CCD 1 is in the pixel add mode.

The alternative address generator may have any configuration as long as it has the functions mentioned above. In this case, the read addresses delivered sequentially to the reader 13 are common in all the lines. The horizontal line division read addresses change cyclically in the same pattern of a 4-pixel group, and increment by 16 for each cycle. Thus, as shown in FIG. 9, the first read address generator 14 comprises a register 141 in which basic read addresses for 16 pixels will be sequentially stored, a reader 142 that reads these addresses sequentially, a base address generator 143 that generates a base address which increments by 16 ("0", "16", "32", . . . ) each time the number of read pixels reaches 16 and an adder 144 that adds the basic read address and the base address, thereby producing a horizontal line division read address.

While, in the above explanation, dedicated circuits that generate write addresses to be delivered to the data distributor 6 and read addresses to be delivered to the reader have been described, the arrangement may be such that the CPU 11 generates or acquires the write addresses or read addresses and then feed these address to the data distributor 6 or the reader.

In the above embodiments, the digital camera has been illustrated which automatically sets the high sensitivity image-capture mode as the still image capture mode when the brightness of the subject is very low and appropriate exposure cannot be obtained by the automatic exposure control or when the exposure time by the automatic exposure control is prolonged compared to the predetermined time and there is a possibility of shake of the subject or of the user's hand which holds the subject. In contrast, the arrangement may be such that when the digital camera has a sensor such as a gyrosensor to sense a shake of the user's hand which holds the camera, the sensor determines whether a shake is sensed when the shutter key is depressed, and if the shake is sensed, the still-image capture mode is automatically changed to the high sensitivity image capture mode.

While in the above explanation the present invention is illustrated as applied to the digital camera, the present invention is applicable to digital video cameras, mobile telephones with a camera, and PDAs with a camera as long as these cameras include a CCD which has a composition in which the charge signals on all the pixels are outputted as a plurality of line segment signals for each horizontal line with a plurality of horizontal sync timing signals constituting a complete cycle.

Various modifications and changes may be made thereunto without departing from the broad spirit and scope of this invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2006-331342 filed on Dec. 8, 2006, and Japanese Patent Application No. 2007-105378 filed on Apr. 13, 2007, respectively, and each including specification, claims, drawings and summary. The disclosure of the above Japanese patent application is incorporated herein by reference in its entirety.

What is claimed is:

1. An image capturing apparatus comprising:
a solid-state image capturing element that includes a 2-dimensional array of pixels comprised of photoelectric conversion elements, wherein the solid-state image capturing element divides the pixels on each of a plurality of horizontal lines into a plurality of groups of a predetermined number of pixels, and outputs charge signals on the pixels in a predetermined order in units of a horizontal line so as to divide the charge signals of each group of the predetermined number of pixels into a plurality of line segments;
a converter that sequentially converts to respective pixel data the charge signals on the pixels outputted in the predetermined order in units of a horizontal line from the solid-state image capturing element;
a storage device that stores the respective pixel data for the horizontal line converted by the converter;
an address acquirer that acquires write addresses for the respective pixel data for the horizontal line converted by the converter such that the pixel data are rearranged and stored in the storage device in a same order that the pixels comprising the solid state image capturing element are arranged, the address acquirer acquiring the write addresses for each of the pixel data based on (i) the order in which an associated one of charge signals on a corresponding line segment is outputted, and (ii) the order of a group on a horizontal line which includes a pixel for said pixel data; and
a storage controller that stores in the storage device the respective pixel data converted by the converter in accordance with the respective write addresses acquired by the address acquirer;
wherein the address acquirer comprises:
an offset position storage unit that stores offset data indicative of a prescribed offset position corresponding to both of (i) the order in which any one of charge signals on a corresponding line segment is outputted, and (ii) the order of any group on a horizontal line which includes a pixel for that pixel data, wherein the offset data is also indicative of the position of the pixel;
a first counter that counts the orders in which the respective charge signals on a corresponding line segment are outputted;
a second counter that counts the respective orders of the groups repeatedly in units of a predetermined number of groups;
a base address generator that generates, as a reference of a write address for each pixel data, a base address corresponding to the number of repetitions indicative of a count of the group orders by the second counter; and
an adder that adds the offset position indicated by the offset data stored in the offset position storage unit and corresponding to the output order counted by the first counter and the group order counted by the second counter, the base address generated by the base address generator, and the position of a head pixel in a corresponding horizontal line in the group including the pixel; and
wherein the storage controller stores the pixel data, converted by the converter in the storage device, in accordance with a write address indicative of a result of the addition by the adder.

2. The image capturing apparatus of claim 1, further comprising:
a drive mode setter that sets as a drive mode for the solid-state image capturing element one of (i) an image add mode in which charge signals on a plurality of pixels are read in an added state and selected in a predetermined manner, and (ii) an all-pixel read mode in which the charge signals on all the pixels are read without being added; and
a drive mode determiner that determines which drive mode is set for the solid-state image capturing element by the drive mode setter;
wherein when the drive mode determiner determines that the drive mode set for the solid-state image capturing unit is the all-pixel read mode, the address acquirer acquirers write addresses for storing the respective pixel data, arranged in the predetermined order, in the storage device in the same order in which the corresponding pixels of the photosensitive surface of the solid-state image capturing element are arranged.

3. The image capturing apparatus of claim 2, wherein when the drive mode determiner determines that the drive mode for the solid-state image capturing element is the image add mode, the address acquirer acquires write addresses for storing in the storage device in the order in which the respective pixel data are converted by the converter.

4. The image capturing apparatus of claim 2, further comprising an image capture mode setter that sets a still-image capture mode; and
  wherein when the still-image capture mode is set by the image capture mode setter, the drive mode setter sets the drive mode for the solid-state image capturing element as the all-pixel read mode.

5. The image capturing apparatus of claim 2, further comprising an image capture mode setter that sets at least one of a moving image capture mode and a high sensitivity still-image capture mode, and
  wherein when at least one of the moving image capture mode and the high sensitivity still-image capture mode is set by the image capture mode setter, the drive mode setter sets the pixel add mode as the drive mode for the solid-state image capturing element.

6. An image capturing method in an image capturing apparatus comprising a solid-state image capturing element that includes a 2-dimensional array of pixels comprised of photoelectric conversion elements, wherein the image capturing element divides the pixels on each of a plurality of horizontal lines into a plurality of groups of a predetermined number of pixels, and outputs charge signals on the pixels in a predetermined order in units of a horizontal line so as to divide the charge signals of each group of the predetermined number of pixels into a plurality of line segments, the method comprising:
  sequentially converting to respective pixel data the charge signals on the pixels outputted in the predetermined order in units of a horizontal line from the solid-state image capturing element;
  acquiring write addresses for storing the respective converted pixel data for the horizontal line in a storage device in a same order that the corresponding pixels comprising the solid state image capturing element are arranged, based on (i) the order in which an associated one of charge signals on a corresponding line segment is outputted, and (ii) the order of a group on a horizontal line which includes a pixel for said pixel data; and
  storing in the storage device the respective converted pixel data in accordance with the respective acquired write addresses;
  wherein the acquiring the write addresses comprises:
    storing offset data indicative of a prescribed offset position corresponding to both of (i) the order in which any one of charge signals on a corresponding line segment is outputted, and (ii) the order of any group on a horizontal line which includes a pixel for that pixel data, wherein the offset data is also indicative of the position of the pixel;
    counting the orders in which the respective charge signals on a corresponding line segment are outputted;
    counting the respective orders of the groups repeatedly in units of a predetermined number of groups;
    generating, as a reference of a write address for each pixel data, a base address corresponding to the number of repetitions indicative of a count by the counting the respective orders of the groups; and
    adding the offset position indicated by the stored offset data and corresponding to the counted charge signal output order and the counted group orders, the generated base address, and the position of a head pixel in a corresponding horizontal line in the group including the pixel; and
  wherein the storing in the storage device comprises storing the converted pixel data in accordance with a write address indicative of a result of the addition by the adder.

* * * * *